United States Patent
Ichimaru

(10) Patent No.: US 12,197,963 B2
(45) Date of Patent: Jan. 14, 2025

(54) ON-VEHICLE CONTROL DEVICE, CONTROL SYSTEM, CONTROL METHOD, AND CONTROL PROGRAM

(71) Applicant: SUMITOMO ELECTRIC INDUSTRIES, LTD., Osaka (JP)

(72) Inventor: Toshihiro Ichimaru, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 851 days.

(21) Appl. No.: 16/976,335

(22) PCT Filed: Feb. 12, 2019

(86) PCT No.: PCT/JP2019/004834
§ 371 (c)(1),
(2) Date: Aug. 27, 2020

(87) PCT Pub. No.: WO2019/167604
PCT Pub. Date: Sep. 6, 2019

(65) Prior Publication Data
US 2021/0049051 A1 Feb. 18, 2021

(30) Foreign Application Priority Data
Mar. 2, 2018 (JP) .................. 2018-037445

(51) Int. Cl.
G06F 9/50 (2006.01)
B60R 16/023 (2006.01)
G06F 3/06 (2006.01)

(52) U.S. Cl.
CPC .......... *G06F 9/5094* (2013.01); *B60R 16/023* (2013.01); *G06F 3/0616* (2013.01); *G06F 9/5044* (2013.01)

(58) Field of Classification Search
None
See application file for complete search history.

(56) References Cited

U.S. PATENT DOCUMENTS

2009/0285586 A1  11/2009  Kawaguchi
2016/0156568 A1* 6/2016  Naganuma ............ G06F 9/5083
                                                709/226
2017/0003890 A1  1/2017  Yoneya et al.
(Continued)

FOREIGN PATENT DOCUMENTS

CN  101581907 A  11/2009
CN  106564499 A   4/2017
(Continued)

*Primary Examiner* — Eric C Wai
(74) *Attorney, Agent, or Firm* — Oliff PLC

(57) ABSTRACT

This on-vehicle control device includes: an acquisition unit configured to acquire a plurality of pieces of wear information regarding a degree of wear of each of a plurality of function units mounted on a vehicle; a selection unit configured to select, on the basis of each piece of the wear information acquired by the acquisition unit, from the plurality of function units, one or a plurality of the function units to be caused to perform a target process that should be performed by one or a plurality of the function units among the plurality of function units; and a control unit configured to perform a control of causing the one or plurality of the function units selected by the selection unit to perform the target process.

14 Claims, 6 Drawing Sheets

(56) References Cited

U.S. PATENT DOCUMENTS

2017/0305369 A1* 10/2017 Ono .................... G07C 5/0825
2018/0275893 A1* 9/2018 Nguyen .............. G06F 11/3058
2019/0051363 A1* 2/2019 Raasch ................ G06F 9/4893

FOREIGN PATENT DOCUMENTS

| JP | 2003-157330 A | 5/2003 |
| JP | 2007-058412 A | 3/2007 |
| JP | 2012-128725 A | 7/2012 |
| JP | 2014-514660 A | 6/2014 |
| WO | 2012/142512 A1 | 10/2012 |
| WO | 2015/087651 A1 | 6/2015 |

* cited by examiner

ON-VEHICLE CONTROL DEVICE, CONTROL SYSTEM, CONTROL METHOD, AND CONTROL PROGRAM

TECHNICAL FIELD

The present invention relates to an on-vehicle control device, a control system, a control method, and a control program.

This application claims priority on Japanese Patent Application No. 2018-37445 filed on Mar. 2, 2018, the entire content of which is incorporated herein by reference.

BACKGROUND ART

Japanese Laid-Open Patent Publication No. 2007-58412 (PATENT LITERATURE 1) discloses a technology that manages the state of resources in a vehicle.

That is, in an on-vehicle system described in PATENT LITERATURE 1, at a timing when an application is to be installed and started, when a remaining system resource amount representing the remaining amount of resources that can be consumed without causing the system at that time point to stop functioning is less than an application resource consumption amount representing the consumption amount of resources to be consumed by the application after the application of which the installation has been requested is installed and started, a process of stopping or deleting an application that is consuming resources at that time point is performed until the remaining system resource amount exceeds the application resource consumption amount. Then, after the remaining system resource amount exceeds the application resource consumption amount, the application is installed and started.

Meanwhile, for example, Japanese Laid-Open Patent Publication No. 2003-157330 (PATENT LITERATURE 2) discloses a technology that collectively manages, via a network, components of operating apparatuses.

That is, the component life management system described in PATENT LITERATURE 2 has: a plurality of sites for detecting life characteristics of components of operating apparatuses; and a component life management server connected to the sites via a network and for collectively managing life characteristics of individual components of the sites. The component life management server includes: reception means for receiving life characteristic data, of components at each site, transmitted via the network from the sites; remaining life prediction means for predicting a remaining component life using the life characteristic data; storage means for sorting the remaining component life for each site and for each component, and for storing a remaining life database; and processing means for outputting information about a remaining component life status or replacement component on the basis of the remaining life database.

CITATION LIST

Patent Literature

PATENT LITERATURE 1: Japanese Laid-Open Patent Publication No. 2007-58412
PATENT LITERATURE 2: Japanese Laid-Open Patent Publication No. 2003-157330

SUMMARY OF INVENTION (1) An on-vehicle control device of the present disclosure includes: an acquisition unit configured to acquire a plurality of pieces of wear information regarding a degree of wear of each of a plurality of function units mounted on a vehicle; a selection unit configured to select, on the basis of each piece of the wear information acquired by the acquisition unit, from the plurality of function units, one or a plurality of the function units to be caused to perform a target process that should be performed by one or a plurality of the function units among the plurality of function units; and a control unit configured to perform a control of causing the one or plurality of the function units selected by the selection unit to perform the target process.

(9) A control system of the present disclosure includes a management device; and an on-vehicle control device. With respect to a plurality of vehicles, the management device acquires a plurality of pieces of wear information regarding a degree of wear of each of a plurality of function units mounted on each vehicle; on the basis of the acquired each piece of the wear information, estimates a degree of wear of one or a plurality of the function units in the vehicle on which the on-vehicle control device is mounted; and transmits estimation information indicating an estimation result, to the on-vehicle control device. The on-vehicle control device: receives the estimation information transmitted from the management device; on the basis of the received estimation information, selects, from the plurality of function units in the vehicle on which the on-vehicle control device is mounted, one or a plurality of the function units to be caused to perform a target process that should be performed by one or a plurality of the function units among the plurality of function units; and performs a control of causing the selected one or plurality of the function units to perform the target process.

(11) A control method of the present disclosure is to be performed in an on-vehicle control device. The control method includes the steps of: acquiring a plurality of pieces of wear information regarding a degree of wear of each of a plurality of function units mounted on a vehicle; on the basis of the acquired each piece of the wear information, selecting, from the plurality of function units, one or a plurality of the function units to be caused to perform a target process that should be performed by one or a plurality of the function units among the plurality of function units; and performing a control of causing the selected one or plurality of the function units to perform the target process.

(12) A control method of the present disclosure is to be performed in a control system including a management device and an on-vehicle control device. The control method includes the steps of: with respect to a plurality of vehicles, acquiring, performed by the management device, a plurality of pieces of wear information regarding a degree of wear of each of a plurality of function units mounted on each vehicle; on the basis of the acquired each piece of the wear information, estimating, performed by the management device, a degree of wear of one or a plurality of the function units in the vehicle on which the on-vehicle control device is mounted, and transmitting, performed by the management device, estimation information indicating an estimation result to the on-vehicle control device; receiving, performed by the on-vehicle control device, the estimation information transmitted from the management device, and selecting on the basis of the received estimation information, performed by the on-vehicle control device, from the plurality of function units in the vehicle on which the on-vehicle control device is mounted, one or a plurality of the function units to be caused to perform a target process that should be performed by one or a plurality of the function units among the plurality of function units; and performing, by the on-vehicle control device, a control of causing the selected one or plurality of the function units to perform the target process.

(13) A control program of the present disclosure is to be used in an on-vehicle control device. The control program causes a computer to function as: an acquisition unit configured to acquire a plurality of pieces of wear information regarding a degree of wear of each of a plurality of function units mounted on a vehicle; a selection unit configured to select, on the basis of each piece of the wear information acquired by the acquisition unit, from the plurality of function units, one or a plurality of the function units to be caused to perform a target process that should be performed by one or a plurality of the function units among the plurality of function units; and a control unit configured to perform a control of causing the one or plurality of the function units selected by the selection unit to perform the target process.

One mode of the present disclosure can be realized not only as an on-vehicle control device that includes such a characteristic processing unit but also as a semiconductor integrated circuit that realizes a part or the entirety of the on-vehicle control device.

One mode of the present disclosure can be realized not only as a control system that includes such a characteristic processing unit but also as a program for causing a computer to execute such a characteristic process. One mode of the present disclosure can be realized as a semiconductor integrated circuit that realizes a part or the entirety of the control system.

DESCRIPTION OF EMBODIMENTS

Figure 1:
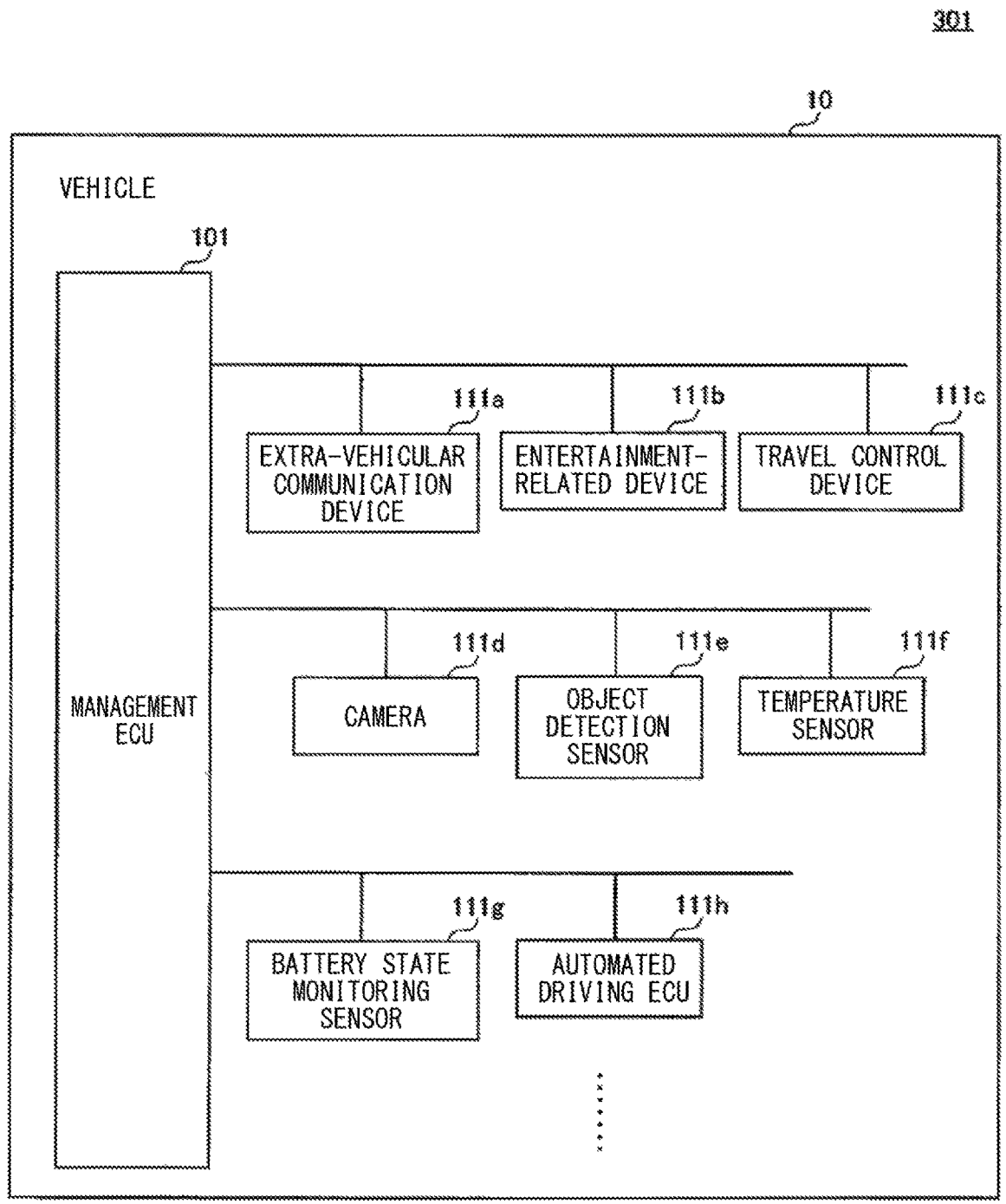
FIG. 1 shows a configuration of an on-vehicle communication system according to a first embodiment of the present disclosure.

To date, in association with increase in the number of vehicles manufactured as EVs (Electric Vehicles), increase in the number of sensors and actuators due to introduction of safe driving support systems into vehicles, and the like, the number of electronic control units (ECUs) mounted on a vehicle is increased, and an on-vehicle network is also becoming complicated. In such a complicated on-vehicle network, a plurality of ECUs transmit/receive data with one another, thereby controlling the vehicle.

In addition, technologies for managing resources of each ECU have been developed.

Problems to be Solved by the Present Disclosure

In the future, the operation rate of each ECU will be highly likely to be increased due to prevalence of shared cars, development of automated driving technology, and the like, and there is a demand for a technology that enables the usable time period of each ECU to be longer.

The present disclosure has been made in order to solve the above problem. An object of the present disclosure is to provide an on-vehicle control device, a control system, a control method, and a control program that enable the usable time period of each function unit mounted on a vehicle to be longer.

Effects of the Present Disclosure

According to the present disclosure, the usable time period of each function unit mounted on a vehicle can be made longer.

Description of Embodiment of the Present Disclosure

First, contents of embodiments of the present disclosure are listed and described.

(1) An on-vehicle control device according to an embodiment of the present disclosure includes: an acquisition unit configured to acquire a plurality of pieces of wear information regarding a degree of wear of each of a plurality of function units mounted on a vehicle; a selection unit configured to select, on the basis of each piece of the wear information acquired by the acquisition unit, from the plurality of function units, one or a plurality of the function units to be caused to perform a target process that should be performed by one or a plurality of the function units among the plurality of function units; and a control unit configured to perform a control of causing the one or plurality of the function units selected by the selection unit to perform the target process.

With this configuration, for example, the target process that should be performed by one or a plurality of function units having a high degree of wear can be distributed to another one or plurality of function units. Thus, increase in the degree of wear of each function unit having a high degree of wear can be suppressed. Therefore, the usable time period of each function unit mounted on the vehicle can be made longer.

(2) Preferably, as the one or plurality of the function units to be caused to perform the target process, the selection unit selects at least one function unit that is different from the one or plurality of the function units that should perform the target process.

With this configuration, for example, the target process that should be performed by a function unit having a high degree of wear can be caused to be performed by another function unit having a lower degree of wear.

(3) Preferably, the wear information includes information regarding heat of the function unit.

With the configuration in which the function unit is selected by using the information regarding heat that could significantly influence the wear of the function unit, the degree of wear of each function unit can be more accurately grasped, and more appropriate selection can be performed.

(4) Preferably, the wear information includes information regarding the number of times of rewriting of a memory included in the function unit.

With this configuration, since the function unit is selected by using the information regarding a memory that is easily worn among electronic components of the function unit, the degree of wear of each function unit can be more accurately grasped, and more appropriate selection can be performed.

(5) Preferably, the control unit further performs a control of reducing processing load of the one or plurality of the function units selected by the selection unit.

With this configuration, for example, the processing load of each selected function unit can be reduced. Thus, increase in the degree of wear of the function unit to which the target process is distributed can be suppressed.

(6) Preferably, the control unit changes a communication frequency of the function unit, as the control of reducing the processing load.

With this configuration, for example, by setting the communication frequency of the selected function unit so as to be reduced, it is possible to reduce the processing load of the function unit.

(7) Preferably, when no function unit is selected by the selection unit, the control unit performs a control of reducing processing load of the function unit that performs the target process.

With this configuration, even when there is no appropriate function unit to which the target process is distributed, increase in the degree of wear of the function unit that performs the target process can be suppressed.

(8) Preferably, the degree of wear is a proportion of an actual use time period in a predetermined period relative to a usable time period of the function unit, or a proportion of an actual number of times of rewriting in a predetermined period relative to a rewritable number of times of a memory included in the function unit. The wear information is information regarding history of temperature of the function unit, or information regarding the rewritable number of times of the memory. The temperature is temperature influenced by both of ambient temperature of the function unit and generated heat of the function unit. The generated heat of the function unit includes heat generated due to operation of various resources in the function unit, heat generated due to turning on/off of a power supply of the function unit, and heat generated due to occurrence of a ripple current.

With this configuration, since the function unit is selected by using information regarding heat that could significantly influence wear of the function unit or regarding a memory that is easily worn among electronic components of the function unit, the degree of wear of each function unit can be more accurately grasped, and a more appropriate function unit can be selected.

(9) A control system according to an embodiment of the present disclosure includes a management device and an on-vehicle control device. With respect to a plurality of vehicles, the management device: acquires a plurality of pieces of wear information regarding a degree of wear of each of a plurality of function units mounted on each vehicle; on the basis of the acquired each piece of the wear information, estimates a degree of wear of one or a plurality of the function units in the vehicle on which the on-vehicle control device is mounted; and transmits estimation information indicating an estimation result, to the on-vehicle control device. The on-vehicle control device: receives the estimation information transmitted from the management device; on the basis of the received estimation information, selects, from the plurality of function units in the vehicle on which the on-vehicle control device is mounted, one or a plurality of the function units to be caused to perform a target process that should be performed by one or a plurality of the function units among the plurality of function units; and performs a control of causing the selected one or plurality of the function units to perform the target process.

With this configuration, for example, the target process that should be performed by one or a plurality of function units having a high degree of wear can be distributed to another one or plurality of function units. Thus, increase in the degree of wear of each function unit having a high degree of wear can be suppressed.

With the configuration in which the management device estimates a degree of wear of each function unit, for example, a more accurate degree of wear can be calculated in the vehicle by using both of the degree of wear estimated by the management device and the degree of wear calculated in the vehicle. Therefore, the usable time period of each function unit mounted on the vehicle can be made longer.

(10) Preferably, the control system further comprises a dealer-side server configured to hold failure information regarding failures of a plurality of the function units. The dealer-side server transmits the failure information to the management device. On the basis of the acquired each piece of the wear information and the failure information received from the dealer-side server, the management device estimates the degree of wear of the one or plurality of the function units.

With the configuration in which the management device estimates a degree of wear of each function unit on the basis of the wear information and the failure information, a more accurate degree of wear can be calculated.

(11) A control method according to an embodiment of the present disclosure is to be performed in an on-vehicle control device. The control method includes the steps of: acquiring a plurality of pieces of wear information regarding a degree of wear of each of a plurality of function units mounted on a vehicle; on the basis of the acquired each piece of the wear information, selecting, from the plurality of function units, one or a plurality of the function units to be caused to perform a target process that should be performed by one or a plurality of the function units among the plurality of function units; and performing a control of causing the selected one or plurality of the function units to perform the target process.

With this method, for example, the target process that should be performed by one or a plurality of function units having a high degree of wear can be distributed to another one or plurality of function units. Thus, increase in the degree of wear of each function unit having a high degree of wear can be suppressed. Therefore, the usable time period of each function unit mounted on the vehicle can be made longer.

(12) A control method according to an embodiment of the present disclosure is to be performed in a control system including a management device and an on-vehicle control device. The control method includes the steps of: with respect to a plurality of vehicles, acquiring, performed by the management device, a plurality of pieces of wear information regarding a degree of wear of each of a plurality of function units mounted on each vehicle; on the basis of the acquired each piece of the wear information, estimating, performed by the management device, a degree of wear of one or a plurality of the function units in the vehicle on which the on-vehicle control device is mounted, and transmitting, performed by the management device, estimation information indicating an estimation result to the on-vehicle control device; receiving, performed by the on-vehicle control device, the estimation information transmitted from the management device, and selecting on the basis of the received estimation information, performed by the on-vehicle control device, from the plurality of function units in the vehicle on which the on-vehicle control device is mounted, one or a plurality of the function units to be caused to perform a target process that should be performed by one or a plurality of the function units among the plurality of function units; and performing, by the on-vehicle control device, a control of causing the selected one or plurality of the function units to perform the target process.

With this method, for example, the target process that should be performed by one or a plurality of function units having a high degree of wear can be distributed to another one or plurality of function units. Thus, increase in the degree of wear of each function unit having a high degree of wear can be suppressed.

With the method in which the management device estimates a degree of wear of each function unit, for example, a more accurate degree of wear can be calculated in the vehicle by using both of the degree of wear estimated by the management device and the degree of wear calculated in the vehicle. Therefore, the usable time period of each function unit mounted on the vehicle can be made longer.

(13) A control program according to an embodiment of the present disclosure is to be used in an on-vehicle control device. The control program causes a computer to function as: an acquisition unit configured to acquire a plurality of pieces of wear information regarding a degree of wear of each of a plurality of function units mounted on a vehicle; a selection unit configured to select, on the basis of each piece of the wear information acquired by the acquisition unit, from the plurality of function units, one or a plurality of the function units to be caused to perform a target process that should be performed by one or a plurality of the function units among the plurality of function units; and a control unit configured to perform a control of causing the one or plurality of the function units selected by the selection unit to perform the target process.

With this configuration, for example, the target process that should be performed by one or a plurality of function units having a high degree of wear can be distributed to another one or plurality of function units. Thus, increase in the degree of wear of each function unit having a high degree of wear can be suppressed. Therefore, the usable time period of each function unit mounted on the vehicle can be made longer.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

First Embodiment

Configuration and Basic Operation

On-Vehicle Communication System

FIG. 1 shows a configuration of an on-vehicle communication system according to a first embodiment of the present disclosure.

With reference FIG. 1, an on-vehicle communication system 301 includes: a management ECU (Electronic Control unit) (on-vehicle control device) 101 mounted on a vehicle 10; and a plurality of ECUs (function units) 111 mounted on the vehicle 10. Hereinafter, the plurality of ECUs 111 in the vehicle 10 will also be referred to as an "ECU group". The plurality of ECUs 111 forming the ECU group (function unit group) will also be referred to as "each ECU 111".

For example, the ECU group includes an extra-vehicular communication device 111a, an entertainment-related device 111b, a travel control device 111c, a camera 111d, an object detection sensor 111e, a temperature sensor 111f, a battery state monitoring sensor 111g, an automated driving ECU 111h, and the like.

Each ECU 111 is connected to the management ECU 101 via a CAN bus according to the CAN (Controller Area Network) (registered trademark) standard, or an Ethernet (registered trademark) cable, for example. At least one ECU 111 in the ECU group may perform wireless communication with the management ECU 101.

Each ECU 111 performs various processes in accordance with instructions from the management ECU 101, and transmits result information indicating the result of each process, to the management ECU 101.

The extra-vehicular communication device 111a can perform wireless communication with a server or the like outside the vehicle 10, via a wireless base station device.

The entertainment-related device 111b controls apparatuses for providing entertainment services, specifically, a display, audio equipment, and the like.

The travel control device 111c is an ECU for controlling traveling of the vehicle 10, and is, for example, an engine control device, an AT (Automatic Transmission) control device, an HEV (Hybrid Electric Vehicle) control device, a brake control device, a chassis control device, a steering control device, an instrument indication control device, or the like.

The camera 111d is an imaging device that takes an image of surroundings of the vehicle 10.

The object detection sensor 111e is a radar device using millimeter waves, for example, and detects objects such as a pedestrian and a vehicle around the vehicle 10. The object detection sensor 111e includes a LiDAR (Light Detection and Ranging) used in automated driving, for example.

The temperature sensor 111f detects interior and exterior temperatures of the vehicle 10, for example.

The battery state monitoring sensor 111g monitors the state of charge (SOC) and the state of health (SOH) of a battery mounted on the vehicle 10, for example.

The automated driving ECU 111h acquires, via the management ECU 101, a detection result by the object detection sensor 111e, and performs control related to automated driving of the vehicle 10 on the basis of the acquired detection result, for example.

Each ECU 111 transmits, to the management ECU 101, wear information regarding the degree of wear of the ECU 111, in a set transmission cycle or non-periodically. The wear information includes at least one of: information regarding heat of the ECU 111; and information regarding the number of times of rewriting R of a memory such as a flash memory included in the ECU 111, for example.

The information regarding heat of the ECU 111 may be information regarding heat of the ECU 111 itself, or may be information regarding heat around the ECU 111. The information regarding heat around the ECU 111 is, for example, information indicating the temperature measured by a temperature sensor provided in the vicinity of the ECU 111.

Each ECU 111 transmits, to the management ECU 101 in a set transmission cycle or non-periodically, resource state information indicating the state of resources of the ECU 111, specifically, the use rate of resources such as a CPU (Central Processing Unit) and a memory.

The management ECU 101 manages the ECU group. More specifically, on the basis of the wear information transmitted from each ECU 111, the management ECU 101 calculates the degree of wear of the corresponding ECU 111. Then, on the basis of the calculated degree of wear of each ECU 111 and the resource state information transmitted from each ECU 111, the management ECU 101 causes a process to be distributed among a plurality of ECUs 111.

For example, the management ECU 101 assigns at least part of a target process that should be performed by one or a plurality of ECUs 111 having a high degree of wear, to another ECU 111 having a low degree of wear. Accordingly, various resources can be effectively utilized, and the usable time period (hereinafter, also referred to as "life") of each ECU 111 can be made longer.

The management ECU 101 may assign the entirety of the target process performed by a certain ECU 111, to another ECU 111. Alternatively, the management ECU 101 may assign part of the target process, e.g., 50% of the target process, to another ECU 111, and may cause the certain ECU 111 to perform the remaining 50%.

Instead of the management ECU 101, at least one ECU 111 in the ECU group may manage the ECU group including the at least one ECU 111.

Management ECU

Figure 2:
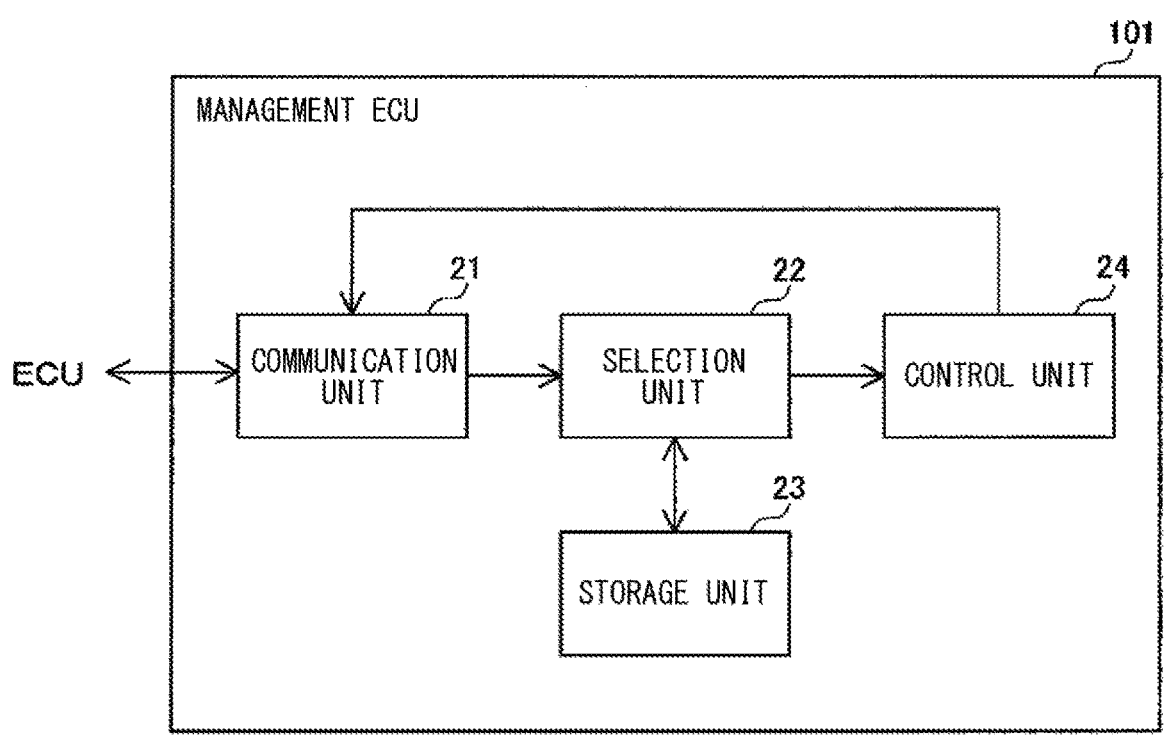
FIG. 2 shows a configuration of a management ECU according to the first embodiment of the present disclosure.

FIG. 2 shows a configuration of the management ECU according to the first embodiment of the present disclosure.

With reference to FIG. 2, the management ECU 101 includes a communication unit (acquisition unit) 21, a selection unit 22, a storage unit 23, and a control unit 24.

The communication unit 21 transmits/receives information to/from each ECU 111. The communication unit 21 relays communication between ECUs 111. The communication unit 21 outputs, to the selection unit 22, wear information, result information, and resource state information which have been transmitted from each ECU 111.

The selection unit 22 stores, into the storage unit 23, the wear information, the result information, and the resource state information which have been received from the communication unit 21. The selection unit 22 calculates a degree of wear of each ECU 111 on the basis of the corresponding wear information stored in the storage unit 23, and confirms whether or not there is any ECU 111 having a high degree of wear.

The degree of wear is, for example, the proportion of an actual use time period in a predetermined period relative to a usable time period. The usable time period of each ECU 111 is obtained through, for example, a reliability test performed by a manufacturer.

When there is one or a plurality of ECUs 111 having a high degree of wear, the selection unit 22 performs a selection process of selecting, from the ECU group, one or a plurality of other ECUs 111 to be caused to perform at least part of a target process that should be performed by the one or plurality of ECUs 111 having the high degree of wear, on the basis of the degree of wear of each ECU 111 and the corresponding resource state information stored in the storage unit 23.

For example, as one or a plurality of ECUs 111 to be caused to perform a target process, the selection unit 22 selects at least one function unit ECU 111 different from the one or plurality of ECUs 111 that should perform the target process.

The target process may be a process that should be performed by one ECU 111, may be a process that should be performed by a plurality of ECUs 111 in cooperation, or may be a plurality of processes that should be respectively performed by a plurality of ECUs 111. Hereinafter, an ECU 111 that substitutively performs the target process will also be referred to as a "substitute ECU".

More specifically, for example, as the substitute ECU that substitutively performs a target process that should be performed by one ECU 111$i$, the selection unit 22 may select another ECU 111$j$, or may select the ECU 111$i$ and another ECU 111$k$. For example, as the substitute ECU that substitutively performs a target process that should be performed by an ECU 111$m$ and an ECU 111$n$ in cooperation, the selection unit 22 may select one ECU 111$p$, may select an ECU 111$q$ and an ECU 111$r$, may select the ECU 111$m$ and an ECU 111$s$, or may select the ECU 111$m$, the ECU 111$n$, and an ECU 111$t$.

The selection unit 22 outputs, to the control unit 24, selection result information indicating the selected one or plurality of substitute ECUs 111 and the content of the target process.

Upon receiving the selection result information from the selection unit 22, the control unit 24 performs, on the basis of the selection result information, a substitution control for causing the one or plurality of substitute ECUs 111 selected by the selection unit 22 to perform the target process. More specifically, as the substitution control, the control unit 24 transmits a processing order indicating the target process, to each substitute ECU 111 via the communication unit 21.

Each substitute ECU 111 receives the processing order transmitted from the management ECU 101, performs the target process in accordance with the processing order, and transmits result information indicating an obtained result, to the management ECU 101.

The control unit 24 receives, via the communication unit 21, the result information transmitted from each substitute ECU 111, and aggregates the result indicated by each received piece of the result information. In the following, details of a calculation process of the degree of wear performed by the selection unit 22, and details of the selection process performed by the selection unit 22 and the substitution control performed by the control unit 24 are described.

Details of Calculation Process of Degree of Wear (a-1) Example 1

Here, it is assumed that the wear information is information regarding heat of an ECU 111 itself, specifically, information regarding a history of temperature of the ECU 111. For example, each ECU 111: has a thermometer that measures the temperature of the ECU 111; attaches a time stamp to wear information indicating a measurement result obtained by the thermometer; and transmits the wear information together with result information and resource state information, to the management ECU 101.

The temperature indicated by the wear information is, for example, a temperature that is influenced by both of the ambient temperature of the ECU 111 and generated heat of the ECU 111. The generated heat of the ECU 111 includes: heat generated due to operation of various resources; heat generated due to turning on/off a power supply of the ECU 111; heat generated due to occurrence of a ripple current; and the like.

The storage unit 23 has stored therein life information indicating the life of each ECU 111, for example. For each ECU 111, the selection unit 22 calculates the proportion of an actual use time period relative to the life, on the basis of the corresponding wear information received via the communication unit 21 from the ECU 111 and the life information stored in the storage unit 23.

Specifically, using an empirical rule such as 10° C. half-life, the selection unit 22 calculates a degree of wear in a predetermined period of each ECU 111. The predetermined period is one minute, one hour, one day, one week, one month, or one year, for example.

For example, it is assumed that, in the life information, the life of a certain ECU 111 when used at 50° C. is 10000 hours. In addition, it is assumed that the predetermined period is one year. In this case, the selection unit 22 calculates a use time period in one year of the ECU 111, thereby calculating the degree of wear of the ECU 111.

More specifically, it is assumed that, for three months from March to May, the ECU 111 was used at an average temperature of 50° C. for 50 hours every month. In this case, the selection unit 22 grasps the use status of the ECU 111 in the three months on the basis of a plurality of pieces of wear information from the ECU 111, and calculates a use time period of the ECU 111 in the three months as 150 hours (=50×3).

Further, it is assumed that, for three months from June to August, the ECU 111 was used at an average temperature of 80° C. for 50 hours every month. In this case, the selection unit 22 grasps the use status of the ECU 111 in the three months on the basis of a plurality of pieces of wear information from the ECU 111, and calculates a use time period of the ECU 111 in the three months on the assumption that the ECU 111 was used at 50° C., as 1200 hours (=50×2^{(80−50)/10}×3).

Further, it is assumed that, for three months from September to November, the ECU 111 was used at an average temperature of 60° C. for 50 hours every month. In this case, the selection unit 22 grasps the use status of the ECU 111 in the three months on the basis of a plurality of pieces of wear information from the ECU 111, and calculates a use time period of the ECU 111 in the three months on the assumption that the ECU 111 was used at 50° C., as 300 hours (=50×2^{(60−50)/10}×3).

Further, it is assumed that, for three months from December to February, the ECU 111 was used at an average temperature of 40° C. for 50 hours every month. In this case, the selection unit 22 grasps the use status of the ECU 111 in the three months on the basis of a plurality of pieces of wear information from the ECU 111, and calculates a use time period of the ECU 111 in the three months on the assumption that the ECU 111 was used at 50° C., as 75 hours (=50×2^{(40−50)/10}×3).

Then, the selection unit 22 calculates a use time period in one year of the ECU 111 as 1725 hours (=150+1200+300+75), and calculates the degree of wear of the ECU 111 as 17.25% (=1725/10000).

In a non-energization period of the on-vehicle communication system 301, transmission of wear information from each ECU 111 to the management ECU 101 is not performed. Thus, the selection unit 22 interpolates the degree of wear of the ECU 111 in the non-energization period, on the basis of a plurality of pieces of wear information received in an energization period.

Figure 3:
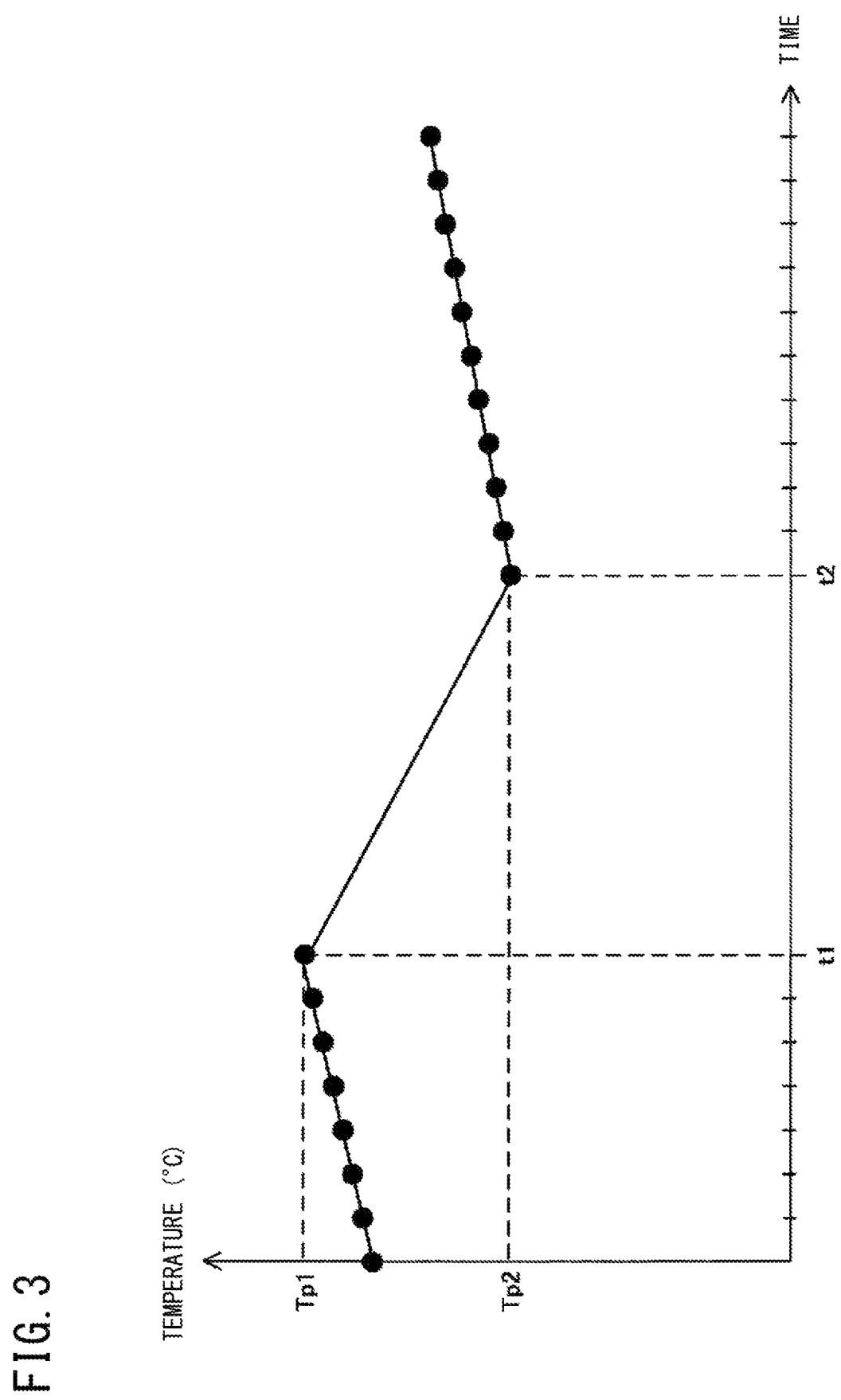
FIG. 3 is a graph for describing an interpolation process performed by a selection unit in the management ECU according to the first embodiment of the present disclosure.

FIG. 3 is a graph for describing an interpolation process performed by the selection unit in the management ECU according to the first embodiment of the present disclosure. In the graph shown in FIG. 3, the vertical axis represents temperature (° C.) and the horizontal axis represents time.

With reference to FIG. 3, the selection unit 22 calculates the temperature of the ECU 111 in a non-energization period through linear interpolation, for example.

Here, it is assumed that the period from time t1 to time t2 was a non-energization period. In this case, for example, the selection unit 22 obtains a formula of a straight line that connects a temperature Tp1 indicated by wear information having a time stamp of time t1 attached thereto, and a temperature Tp2 indicated by wear information having a time stamp of time t2 attached thereto. Then, using the formula of the straight line, the selection unit 22 calculates a plurality of temperatures of the ECU 111 at a plurality of respective timings included in the non-energization period.

Then, on the basis of the plurality of calculated temperatures respectively corresponding to the plurality of timings included in the non-energization period, and a plurality of temperatures respectively corresponding to a plurality of timings included in an energization period, the selection unit 22 calculates the degree of wear of the ECU 111 in the predetermined period including the energization period and the non-energization period.

(a-2) Example 2

The selection unit 22 may calculate a degree of wear of each ECU 111 by using a temperature determined as a specification of the ECU 111 (hereinafter, also referred to as "temperature specification"). The temperature specification of each ECU 111 is stored in the storage unit 23, for example.

Specifically, it is assumed that the temperature specification of a first ECU 111 is 85° C. and the actual temperature (hereinafter, also referred to as "usage temperature") of the first ECU 111 in a predetermined period is 60° C. In this case, the selection unit 22 calculates the degree of wear of the ECU 111 in the predetermined period as 70.6% (=60/85).

In addition, for example, it is assumed that the temperature specification of a second ECU 111 is 125° C. and the usage temperature of the second ECU 111 in the predetermined period is 65° C. In this case, the selection unit 22 calculates the degree of wear of the ECU 111 in the predetermined period as 52.0% (=65/125).

In this calculation method, in the predetermined period, although the temperature of the second ECU 111 is higher than the temperature of the first ECU 111, the value of the degree of wear of the second ECU 111 is lower than that of the degree of wear of the first ECU 111.

As in "(a-1) Example 1", in a case where the predetermined period is divided into a plurality of periods, and the selection unit 22 calculates a use time period of the ECU 111 in each divided period, the use time period in each divided period may be multiplied by a proportion of the usage temperature of the ECU 111 in the divided period relative to the temperature specification.

(a-3) Example 3

Here, it is assumed that the wear information is information regarding the number of times of rewriting R of a memory included in the corresponding ECU 111. For example, each ECU 111 counts the number of times of rewriting R of the memory of the ECU 111, attaches a time stamp to wear information indicating the count value, and transmits the resultant wear information together with result information and resource state information, to the management ECU 101.

The life information stored in the storage unit 23 indicates a rewritable number of times Rmax of a memory of each of a plurality of ECUs 111. For each ECU 111, the selection unit 22 calculates the number of times of rewriting Rt in a predetermined period, on the basis of a plurality of pieces of wear information received via the communication unit 21 in the predetermined period from the ECU 111.

For example, the selection unit 22 subtracts a minimum value from a maximum value of the number of times of rewriting R indicated by each of the plurality of pieces of wear information received in the predetermined period, thereby calculating an actual number of times of rewriting Rt in the predetermined period.

Then, the selection unit 22 calculates, as the degree of wear, the proportion of the calculated number of times of rewriting Rt relative to the rewritable number of times Rmax indicated by the life information stored in the storage unit 23.

Details of Selection Process and Substitution Control (b-1) Example 1

With reference to FIG. 2 again, here, it is assumed that, in the ECU group, there is an ECU 111 of which the degree of wear in the predetermined period is not less than a threshold Th1 (hereinafter, also referred to as "high-wear-degree ECU 111"). In this case, on the basis of resource state information which has been transmitted from each ECU 111 and which is stored in the storage unit 23, the selection unit 22 selects one or a plurality of substitute ECUs 111 to be caused to perform the target process that should be performed by one or a plurality of high-wear-degree ECUs 111.

More specifically, for example, as the substitute ECU 111, the selection unit 22 selects, out of the ECU group, one or a plurality of ECUs 111 of which the degree of wear in the predetermined period is not greater than a threshold Th2 (hereinafter, also referred to as "low-wear-degree ECU 111"), and of which the use rate of resources is not greater than a threshold Th3. Then, the selection unit 22 outputs, to the control unit 24, selection result information indicating the selected one or plurality of substitute ECUs 111 and the content of the target process.

Upon receiving the selection result information from the selection unit 22, the control unit 24 transmits, on the basis of the selection result information, a processing order for causing the target process to be performed, to each substitute ECU 111 selected by the selection unit 22. Accordingly, the target process that should be performed by one or a plurality of high-wear-degree ECUs 111 can be distributed to one or a plurality of ECUs 111 which are each a low-wear-degree ECU 111 and of which the use rate of resources is low.

The control unit 24 may further perform a control of reducing the processing load of each substitute ECU 111, i.e., a control of reducing the use rate of resources such as a CPU and a memory. Accordingly, increase in the degree of wear of the substitute ECU 111 can be suppressed.

For example, when the target process includes a communication process to be performed with the management ECU 101, the control unit 24 changes the communication process of the substitute ECU 111 such that the frequency of communication to be performed with the management ECU 101 is reduced. Specifically, as the control for reducing the communication frequency of the substitute ECU 111 with respect to the management ECU 101, the control unit 24 performs setting such that the wear information and the result information are thinned to be transmitted, or performs setting such that the transmission cycle of the wear information and the result information is extended.

For the substitute ECU 111, the control unit 24 may perform a control of reducing the processing load of substitute ECU 111 by performing setting such that the resolution of a display screen or the like is reduced.

(b-2) Example 2

It is assumed that, in the ECU group, there is no ECU 111 that is a low-wear-degree ECU 111 and of which the use rate of resources is not greater than the threshold Th3. In addition, it is assumed that none of one or a plurality of high-wear-degree ECUs 111 is an ECU 111 that performs a control related to travel of the vehicle 10 (hereinafter, also referred to as "travel control system ECU 111"). The travel control system ECU 111 is the travel control device 111c or the automated driving ECU 111h, for example.

In this case, the selection unit 22 determines not to select any substitute ECU 111. That is, the selection unit 22 determines that the target process that should be performed by one or a plurality of high-wear-degree ECUs 111 is not distributed to other ECUs 111. Then, the selection unit 22 outputs, to the control unit 24, selection result information indicating the determined content.

Upon receiving the selection result information from the selection unit 22, the control unit 24 determines, in accordance with the selection result information, not to perform the substitution control for the target process.

When having determined that the target process is not distributed to other ECUs 111, the selection unit 22 may output, to the control unit 24, instruction information that instructs reduction of the processing load of each high-wear-degree ECU 111.

In this case, upon receiving the instruction information from the selection unit 22, the control unit 24 performs a control of reducing the processing load of each high-wear-degree ECU 111, on the basis of the instruction information. For example, with respect to the high-wear-degree ECU 111, the control unit 24 limits the content of the target process by making a change such that the communication frequency with the management ECU 101 is reduced, or by performing setting such that the resolution of a display screen or the like is reduced.

Accordingly, each high-wear-degree ECU 111 can suppress increase in the degree of wear by reducing the use rate of resources while performing the target process that the high-wear-degree ECU 111 should perform.

(b-3) Example 3

Here, it is assumed that, in the ECU group, there is no ECU 111 that is a low-wear-degree ECU 111 and of which the use rate of resources is not greater than the threshold Th3. In addition, it is assumed that at least one of one or a plurality of high-wear-degree ECUs 111 is the travel control system ECU 111.

In this case, for example, as the substitute ECU 111, the selection unit 22 selects, out of the ECU group, one or a plurality of ECUs 111 that are each an ECU 111 other than the travel control system ECU 111 and being a high-wear-degree ECU 111, and of which the use rate of resources is not greater than the threshold Th3.

Then, the selection unit 22 outputs, to the control unit 24, selection result information indicating the selected one or plurality of substitute ECUs 111 and the content of the target process.

Upon receiving the selection result information from the selection unit 22, the control unit 24 transmits, on the basis of the selection result information, a processing order for causing the target process to be performed, to each substitute ECU 111 selected by the selection unit 22.

Accordingly, the target process that should be performed by one or a plurality of high-wear-degree ECUs 111 can be distributed to one or a plurality of ECUs 111 which are each an ECU 111 other than the travel control system ECU 111 and of which the use rate of resources is low.

In addition, the control unit 24 may further perform a control of reducing the processing load of each substitute ECU 111, as described in (b-1).

(b-4) Example 4

Here, it is assumed that, in the ECU group, there is no ECU 111 of which the use rate of resources is not greater than the threshold Th3, and at least one of one or a plurality of high-wear-degree ECUs 111 is the travel control system ECU 111.

In this case, as the substitute ECU 111, the selection unit 22 selects, out of the ECU group, an ECU 111 other than the travel control system ECU 111, e.g., the entertainment-related device 111b. Then, the selection unit 22 outputs, to the control unit 24, selection result information indicating the selected one or plurality of substitute ECUs 111 and the content of the target process, and instruction information that instructs reduction of the processing load of each substitute ECU 111, for example.

Upon receiving the selection result information and the instruction information from the selection unit 22, the control unit 24 transmits, on the basis of the selection result information, a processing order for causing the target process to be performed, to each substitute ECU 111 selected by the selection unit 22. In addition, the control unit 24 performs a control of reducing the processing load of each substitute ECU 111, on the basis of the instruction information.

Accordingly, even in a case where there is no ECU 111 of which the use rate of resources is not greater than the threshold Th3, the target process that should be performed by one or a plurality of high-wear-degree ECUs 111 can be distributed to one or a plurality of ECUs 111 that would not influence traveling of the vehicle 10 even if the use rate of resources is reduced.

Operation Flow

Each of the devices in the on-vehicle communication system 301 includes a computer. An arithmetic processing unit such as a CPU in the computer reads out a program including a part or all of steps in the sequence diagram or flow chart described below from a memory (not shown), and executes the program. The programs for the plurality of devices can be installed from outside. The programs for the plurality of devices are each distributed in a state of being stored in a storage medium.

Figure 4:
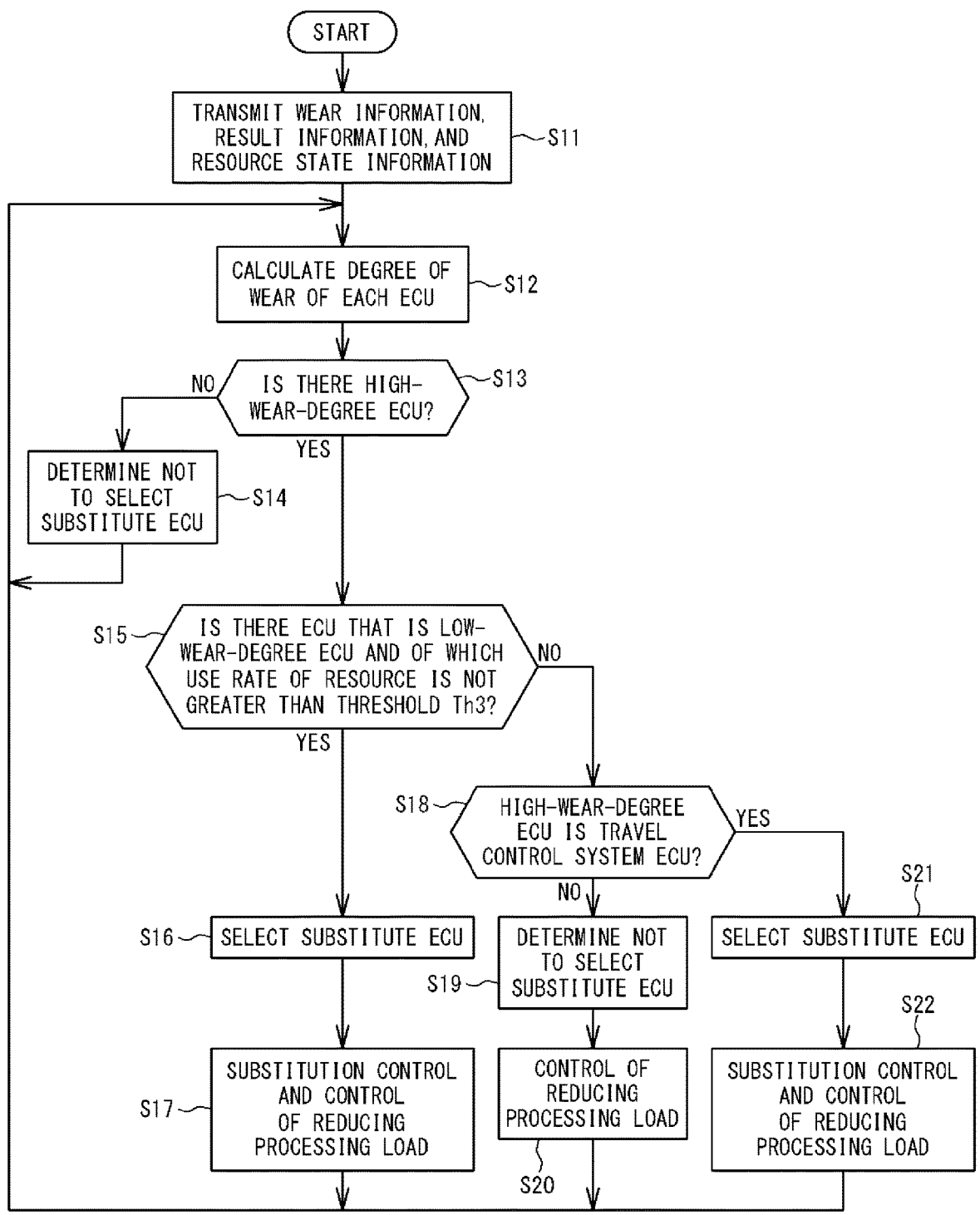
FIG. 4 is a flow chart showing an example of an operation flow of the on-vehicle communication system according to the first embodiment the present disclosure.

FIG. 4 is a flow chart showing an example of an operation flow of the on-vehicle communication system according to the first embodiment of the present disclosure.

With reference to FIG. 2 and FIG. 4, first, each ECU 111 transmits, to the management ECU 101, wear information, result information, and resource state information in a set transmission cycle, for example (step S11).

Next, the selection unit 22 in the management ECU 101 receives, via the communication unit 21, the wear information, the result information, and the resource state information transmitted from each ECU 111, and stores these pieces of information into the storage unit 23. Then, for example, when a predetermined period including a plurality of the transmission cycles has elapsed, the selection unit 22 calculates a degree of wear of each ECU 111 in the predetermined period, on the basis of a plurality of pieces of the wear information stored in the storage unit 23 (step S12).

Next, the selection unit 22 in the management ECU 101 confirms whether or not there is a high-wear-degree ECU 111 in the ECU group (step S13).

When there is no high-wear-degree ECU 111 ("NO" in step S13), the selection unit 22 determines not to select any substitute ECU 111 (step S14). Then, until the next predetermined period has elapsed, the selection unit 22 repeats reception of wear information, result information, and resource state information, and storage of these pieces of information into the storage unit 23. Then, when the predetermined period has elapsed, the selection unit 22 calculates a degree of wear of each ECU 111 in the predetermined period (step S12).

Meanwhile, when there is a high-wear-degree ECU 111 ("YES" in step S13), the selection unit 22 confirms, on the basis of the resource state information transmitted from each ECU 111 and stored in the storage unit 23, whether or not, in the ECU group, there is an ECU 111 that is a low-wear-degree ECU 111 and of which the use rate of resources is not greater than the threshold Th3 (step S15).

Then, when there is one or a plurality of ECUs 111 that are each a low-wear-degree ECU 111 and of which the use rate of resource is not greater than the threshold Th3 ("YES" in step S15), the selection unit 22 selects the one or plurality of ECUs 111 as the substitute ECU 111. Then, the selection unit 22 outputs, to the control unit 24, selection result information indicating the selection result and the content of the target process (step S16).

Next, upon receiving the selection result information from the selection unit 22, the control unit 24 performs, on the basis of the selection result information, a substitution control of causing each substitute ECU 111 selected by the selection unit 22 to perform the target process, and a control of reducing the processing load of each substitute ECU 111, for example (step S17).

Meanwhile, when there is no ECU 111 that is a low-wear-degree ECU 111 and of which the use rate of resources is not greater than the threshold Th3 ("NO" in step S15), the selection unit 22 confirms whether or not the high-wear-degree ECU 111 is the travel control system ECU 111 (step S18).

Then, when none of one or a plurality of high-wear-degree ECUs 111 is the travel control system ECU 111 ("NO" in step S18), the selection unit 22 determines not to select any substitute ECU 111. Then, the selection unit 22 outputs, to the control unit 24, selection result information indicating the determined content and instruction information that instructs reduction of the processing load of each high-wear-degree ECU 111 (step S19).

Next, upon receiving the selection result information and the instruction information from the selection unit 22, the control unit 24 performs, on the basis of the selection result information and the instruction information, a control of reducing the processing load of each high-wear-degree ECU 111 (step S20).

Meanwhile, when at least one of one or a plurality of high-wear-degree ECUs 111 is the travel control system ECU 111 ("YES" in step S18), the selection unit 22 selects, as the substitute ECU 111, one or a plurality of ECUs 111, in the ECU group, that are each an ECU 111 other than the travel control system ECU 111 and being the high-wear-degree ECU 111 and of which the use rate of resources is not greater than the threshold Th3. Then, the selection unit 22 outputs, to the control unit 24, selection result information indicating the selection result and the content of the target process (step S21).

Next, upon receiving the selection result information from the selection unit 22, the control unit 24 performs, on the basis of the selection result information, a substitution control of causing each substitute ECU 111 selected by the selection unit 22 to perform the target process, and a control of reducing the processing load of each substitute ECU 111 (step S22).

In step S21, for example, when there is no ECU 111 of which the use rate of resources is not greater than the threshold Th3, the selection unit 22 may select the entertainment-related device 111b or the like as the substitute ECU 111. In this case, for example, the selection unit 22 outputs, to the control unit 24, selection result information indicating the selection result and instruction information that instructs reduction of the processing load of one or a plurality of substitute ECUs 111.

Then, in step S22, upon receiving the selection result information and the instruction information from the selection unit 22, the control unit 24 performs, on the basis of the selection result information and the instruction information, a substitution control of causing each substitute ECU 111 selected by the selection unit 22 to perform the target process, and a control of reducing the processing load of each substitute ECU 111.

In step S12, the selection unit 22 newly calculates a degree of wear of each ECU 111 in the next predetermined period, and when the degree of wear of an ECU 111 having been the high-wear-degree ECU 111 in the previous predetermined period has changed to be less than the threshold Th1, the selection unit 22 outputs, to the control unit 24, end instruction information that instructs ending of the distribution of the target process that should be performed by the ECU 111.

Upon receiving the end instruction information from the selection unit 22, the control unit 24 performs, on the basis of the end instruction information, a control of causing the target process having been performed by one or a plurality of substitute ECUs 111 selected by the selection unit 22, to be performed by one or a plurality of ECUs 111 that should perform the target process.

Meanwhile, in the future, the operation rate of each ECU will highly likely to be increased due to prevalence of shared cars, development of automated driving technology, and the like, and there is a demand for a technology that enables the usable time period of each ECU to be longer.

Therefore, in the management ECU 101 according to the first embodiment of the present disclosure, the communication unit 21 acquires a plurality of pieces of wear information regarding the degree of wear of each of a plurality of ECUs 111 mounted on the vehicle 10. On the basis of each piece of the wear information acquired by the communication unit 21, the selection unit 22 selects, from the plurality of ECUs 111, one or a plurality of substitute ECUs 111 to be caused to perform a target process that should be performed by one or a plurality of ECUs 111 among the plurality of ECUs 111. Then, the control unit 24 performs a control of causing the one or plurality of substitute ECUs 111 selected by the selection unit 22 to perform the target process.

With this configuration, for example, the target process that should be performed by one or a plurality of high-wear-degree ECUs 111 can be distributed to another one or plurality of ECUs 111. Thus, increase in the degree of wear of each high-wear-degree ECU 111 can be suppressed.

Therefore, in the management ECU 101 according to the first embodiment of the present disclosure, the usable time period of each ECU 111 mounted on the vehicle 10 can be made longer.

In the management ECU 101 according to the first embodiment of the present disclosure, as the one or plurality of ECUs 111 to be caused to perform the target process, the selection unit 22 selects at least one ECU 111 that is different from the one or plurality of ECUs 111 that should perform the target process.

With this configuration, for example, the target process that should be performed by the high-wear-degree ECU 111 can be performed by the low-wear-degree ECU 111.

The wear information acquired by the communication unit 21 in the management ECU 101 according to the first embodiment of the present disclosure includes information regarding heat of the ECU 111.

With the configuration in which the substitute ECU 111 is selected by using the information regarding heat that could significantly influence the wear of the ECU 111, the degree of wear of each ECU 111 can be more accurately grasped, and more appropriate selection can be performed.

The wear information acquired by the communication unit 21 in the management ECU 101 according to the first embodiment of the present disclosure includes information regarding the number of times of rewriting R of a memory included in the ECU 111.

With this configuration, since the substitute ECU 111 is selected by using the information regarding a memory that is easily worn among electronic components of the ECU 111, the degree of wear of each ECU 111 can be more accurately grasped, and more appropriate selection can be performed.

In the management ECU 101 according to the first embodiment of the present disclosure, the control unit 24 further performs a control of reducing the processing load of the one or plurality of substitute ECUs 111 selected by the selection unit 22.

With this configuration, for example, the processing load of each substitute ECU 111 can be reduced. Thus, increase in the degree of wear of the substitute ECU 111 to which the target process is distributed can be suppressed.

In the management ECU 101 according to the first embodiment of the present disclosure, the control unit 24 changes the communication frequency of the substitute ECU 111, as the control of reducing the processing load.

With this configuration, for example, by setting the communication frequency of the substitute ECU 111 so as to be reduced, it is possible to reduce the processing load of the substitute ECU 111.

In the management ECU 101 according to the first embodiment of the present disclosure, when no substitute ECU 111 is selected by the selection unit 22, the control unit 24 performs a control of reducing the processing load of the high-wear-degree ECU 111 that performs the target process.

With this configuration, even when there is no appropriate ECU 111 to which the target process is distributed, increase in the degree of wear of the high-wear-degree ECU 111 that performs the target process can be suppressed.

In the management ECU 101 according to the first embodiment of the present disclosure, the degree of wear is a proportion of an actual use time period in a predetermined period relative to a usable time period of the ECU 111, or a proportion of an actual number of times of rewriting in a predetermined period relative to a rewritable number of times of a memory included by the ECU 111. The wear information is information regarding history of the temperature of the ECU 111, or information regarding the rewritable number of times of the memory. The temperature is a temperature influenced by both of the ambient temperature of the ECU 111 and generated heat of the ECU 111. The generated heat of the ECU 111 includes heat generated due to operation of various resources in the ECU 111, heat generated due to turning on/off of a power supply of the ECU 111, and heat generated due to occurrence of a ripple current.

With this configuration, since the substitute ECU 111 is selected by using information regarding heat that could significantly influence wear of the ECU 111 or regarding a memory that is easily worn among electronic components of the ECU 111, the degree of wear of each ECU 111 can be more accurately grasped, and a more appropriate substitute ECU 111 can be selected.

In a control method to be performed in the management ECU 101 according to the first embodiment of the present disclosure, first, the communication unit 21 acquires wear information regarding the degree of wear of each of a plurality of ECUs 111 mounted on the vehicle 10. Next, on the basis of each piece of the wear information acquired by the communication unit 21, the selection unit 22 selects, from an ECU group composed of a plurality of ECUs 111, one or a plurality of substitute ECUs 111 to be caused to perform a target process that should be performed by at least one ECU 111 in the ECU group. Then, the control unit 24 performs a substitution control of causing the one or plurality of substitute ECUs 111 selected by the selection unit 22, to perform the target process.

With this method, for example, the target process that should be performed by one or a plurality of high-wear-degree ECUs 111 can be distributed to another one or plurality of ECUs 111. Thus, increase in the degree of wear of each high-wear-degree ECU 111 can be suppressed.

Therefore, in the control method performed in the management ECU 101 according to the first embodiment of the present disclosure, the usable time period of each ECU 111 mounted on the vehicle 10 can be made longer.

Next, another embodiment of the present disclosure is described with reference to the drawings. In the drawings, the same or corresponding parts are denoted by the same reference signs, and descriptions thereof are not repeated.

Second Embodiment

In the first embodiment described above, the management ECU 101 mounted on the vehicle 10 calculates the degree of wear of each ECU 111, and performs the selection process of the substitute ECU 111 on the basis of the calculated degree of wear of each ECU 111. In contrast to this, in the second embodiment, a management server (management device) 121 estimates the degree of wear of each ECU 111 mounted on a vehicle 11, and the management ECU 101 in the vehicle 11 performs a selection process of the substitute ECU 111 on the basis of an estimation result by the management server 121. Except for the contents described below, the configuration is the same as that of the on-vehicle communication system 301 according to the first embodiment.

Configuration and Basic Operation

Figure 5:
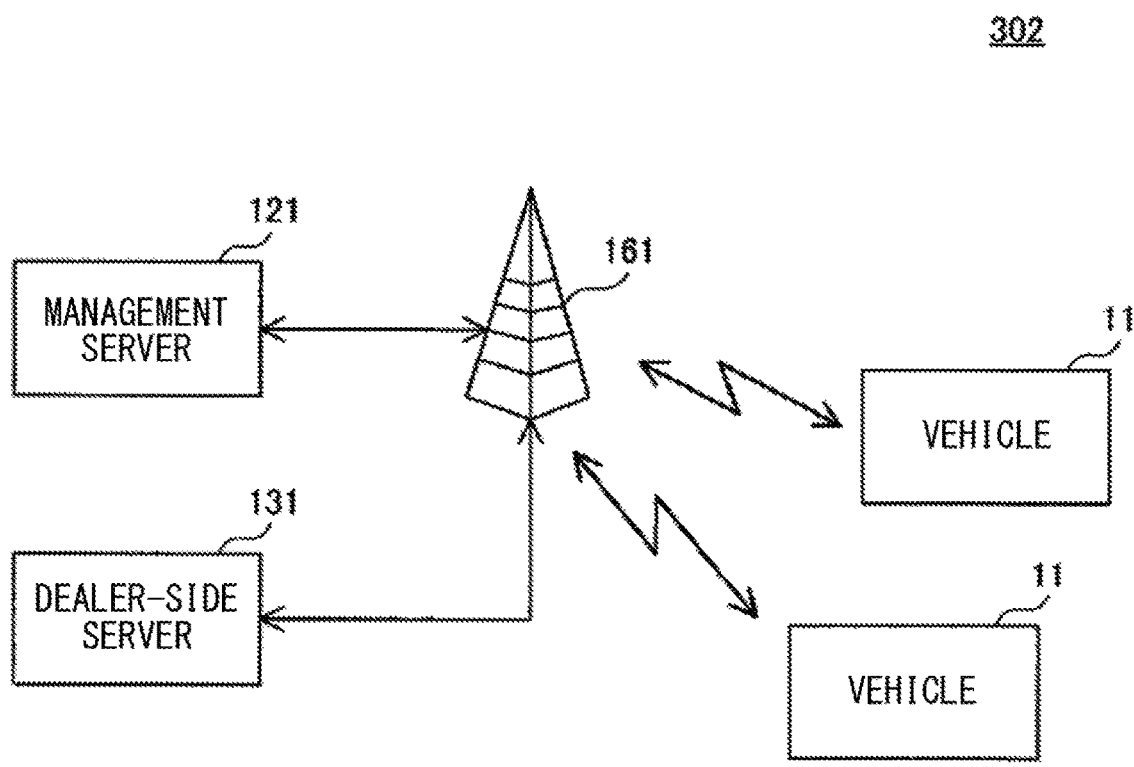
FIG. 5 shows a configuration of a control system according to a second embodiment of the present disclosure.

FIG. 5 shows a configuration of a control system according to the second embodiment of the present disclosure.

With reference to FIG. 5, a control system 302 includes one or a plurality of the vehicles 11, the management server 121, a dealer-side server 131, and a wireless base station device 161. In FIG. 5, two vehicles 11 are shown as an example.

The vehicle 11 according to the second embodiment includes the management ECU 101 and a plurality of ECUs 111, as in the vehicle 10 shown in FIG. 1. As shown in FIG. 2, the management ECU 101 includes the communication unit 21, the selection unit 22, the storage unit 23, and the control unit 24.

The selection unit 22 transmits, to the management server 121, a plurality of pieces of wear information respectively received from the plurality of ECUs 111, via the communication unit 21, the extra-vehicular communication device 111*a* shown in FIG. 1, and the wireless base station device 161.

The dealer-side server 131 holds failure information regarding failures of a plurality of ECUs 111. The failure information indicates, for example, a correspondence relationship between the type of the ECU 111, the date of manufacture of the ECU 111, the use period of the ECU 111, and the number of ECUs 111 that have failed among a plurality of ECUs 111 manufactured on the date of manufacture.

The dealer-side server 131 periodically or non-periodically updates the failure information, for example, and transmits the updated failure information to the management server 121 via the wireless base station device 161.

On the basis of the plurality of pieces of the wear information received via the wireless base station device 161 from each vehicle 11, and the failure information received via the wireless base station device 161 from the dealer-side server 131, the management server 121 estimates a degree of wear of each of the plurality of ECUs 111 in each vehicle 11.

Specifically, the wear information from the vehicle 11 indicates the type, the date of manufacture, etc., of each ECU 111, for example. With reference the type and date of manufacture of each of the plurality of ECUs 111 respectively indicated by the plurality of pieces of the wear information received from the vehicle 11, and the above-described correspondence relationship indicated by the failure information, the management server 121 estimates, as the usable time period, a time period until the probability of occurrence of a failure becomes not less than a predetermined value.

The management server 121 calculates a use time period of each ECU 111 on the basis of the corresponding wear information, and calculates, for each ECU 111, a proportion of the use time period relative to the estimated usable time period, thereby estimating a degree of wear of each ECU 111.

Then, the management server 121 transmits estimation information indicating the estimated degree of wear of each ECU 111, and the type, date of manufacture, etc., of each ECU 111, to the one or a plurality of the vehicles 11 and the dealer-side server 131 via the wireless base station device 161.

The selection unit 22 in the vehicle 11 receives the estimation information transmitted from the management server 121, via the wireless base station device 161, the extra-vehicular communication device 111*a*, and the communication unit 21. Then, on the basis of the received estimation information, the selection unit 22 selects, from the ECU group in the vehicle 11, one or a plurality of substitute ECUs 111 to be caused to perform a target process.

More specifically, on the basis of the received estimation information, the selection unit 22 calculates a degree of wear of each ECU 111 in the vehicle 11. For example, for each ECU 111, the selection unit 22 assigns weights to the degree of wear calculated by using the method described in (a-1) or the method described in (a-2) and to the degree of wear indicated by the received estimation information, and performs addition thereof. Accordingly, the selection unit 22 calculates a degree of wear of each ECU 111 reflecting the content of the estimation information.

Then, on the basis of the calculated degree of wear of each ECU 111, and the corresponding resource state information stored in the storage unit 23, the selection unit 22 performs a selection process of the substitute ECU 111.

The selection unit 22 may not necessarily perform the calculation of the degree of wear of each ECU 111. In this case, for example, the selection unit 22 determines the magnitude of the degree of wear of each ECU 111 by using the estimation information received from the management server 121, and performs a selection process of the substitute ECU 111.

The dealer-side server 131 receives, via the wireless base station device 161, the estimation information transmitted from the management server 121, and on the basis of the received estimation information, determines whether the degree of wear of each ECU 111 estimated by the management server 121 is valid.

For example, on the basis of the failure information held by the dealer-side server 131, and the type, date of manufacture, etc., of each ECU 111 indicated by the estimation information received from the management server 121, the dealer-side server 131 specifies one or a plurality of ECUs 111 that are highly likely to fail. In addition, the dealer-side server 131 confirms the corresponding degree of wear indicated by the estimation information, thereby determining whether the degree of wear of each ECU 111 estimated by the management server 121 is valid.

Then, for example, the dealer-side server 131 transmits, to the management server 121 via the wireless base station device 161, determination result information indicating a validity determination result.

When the vehicle 11 has broken down, the dealer-side server 131 can use the estimation information and the validity determination result received from the management server 121, in estimation of the cause of the breakdown of the vehicle 11.

Operation Flow

Figure 6:
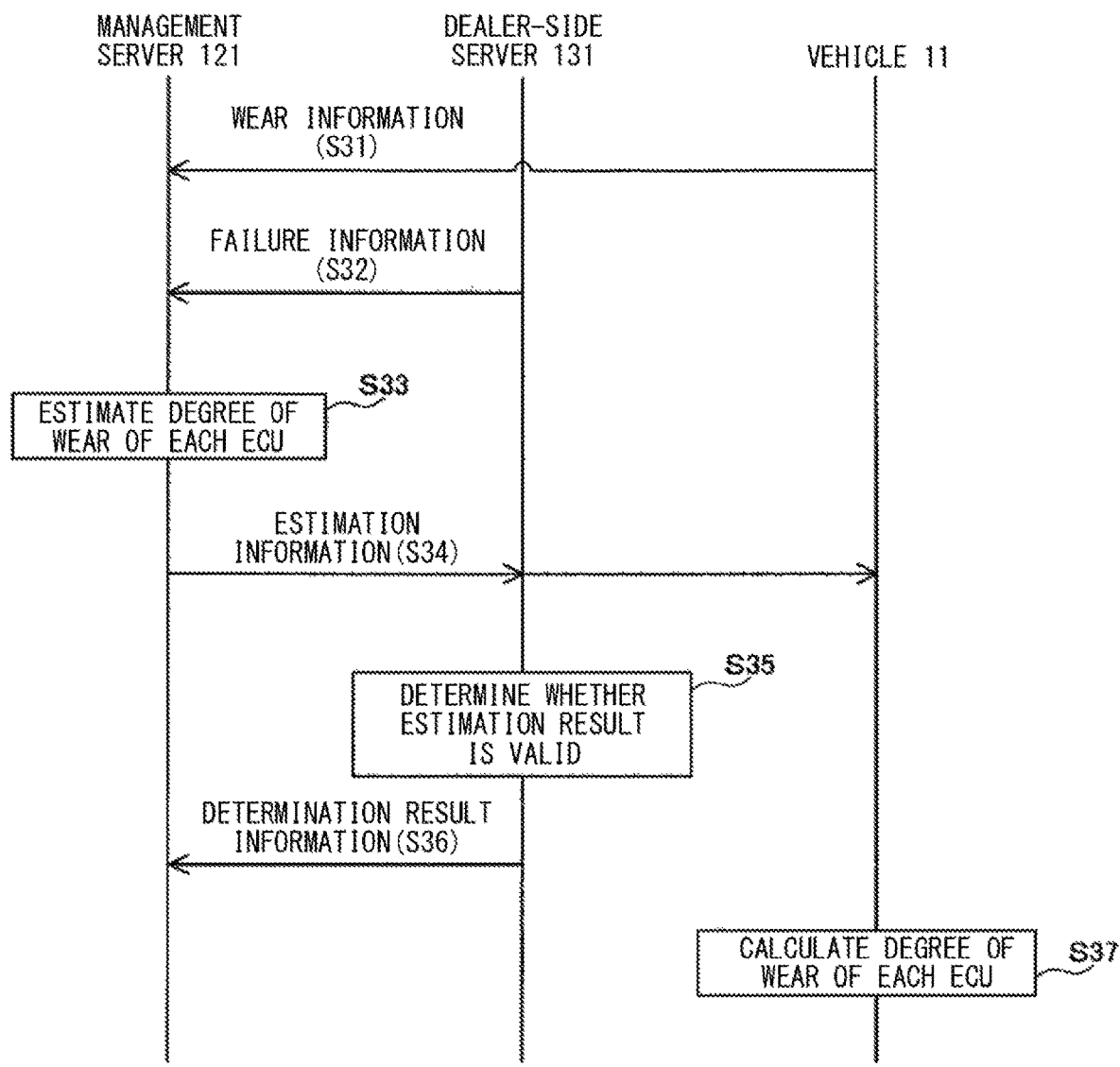
FIG. 6 is a sequence diagram showing an example of an operation flow of the control system according to the second embodiment of the present disclosure.

FIG. 6 is a sequence diagram showing an example of an operation flow of the control system according to the second embodiment of the present disclosure.

With reference to FIG. 5 and FIG. 6, first, the management ECU 101 in the vehicle 11 periodically or non-periodically transmits wear information of each ECU 111 to the management server 121 via the extra-vehicular communication device 111a and the wireless base station device 161 (step S31).

Next, for example, every time the dealer-side server 131 updates failure information held therein, the dealer-side server 131 transmits the updated failure information to the management server 121 via the wireless base station device 161 (step S32).

Next, on the basis of the plurality of pieces of the wear information received from the vehicle 11 and the failure information received from the dealer-side server 131, the management server 121 estimates a degree of wear of each ECU 111 in the vehicle 11 (step S33).

Next, the management server 121 transmits estimation information indicating the estimated degree of wear of each ECU 111 to the vehicle 11 and the dealer-side server 131 via the wireless base station device 161 (step S34).

Next, on the basis of the estimation information received from the management server 121, the dealer-side server 131 determines whether the degree of wear of each ECU 111 estimated by the management server 121 is valid (step S35). Then, the dealer-side server 131 transmits determination result information indicating the determination result, to the management server 121 via the wireless base station device 161 (step S36).

Meanwhile, on the basis of the estimation information received from the management server 121, the selection unit 22 in the vehicle 11 calculates a degree of wear of each ECU 111 in the vehicle 11 (step S37) as in step S12 shown in FIG. 4, and then performs operations similar to the operations shown in FIG. 4.

The other configurations and operations are the same as those of the on-vehicle communication system 301 according to the first embodiment of the present disclosure, and thus detailed descriptions thereof are not repeated.

As described above, in the control system 302 according to the second embodiment of the present disclosure, with respect to a plurality of vehicles 11, the management server 121: acquires a plurality of pieces of wear information regarding the degree of wear of each of a plurality of ECUs 111 mounted on each vehicle 11; on the basis of the acquired each piece of the wear information, estimates a degree of wear of one or a plurality of ECUs 111 in the vehicle 11 on which a management ECU 101 is mounted; and transmits estimation information indicating an estimation result, to the management ECU 101. Then, the management ECU 101: receives the estimation information transmitted from the management server 121; on the basis of the received estimation information, selects, from the plurality of ECUs 111 in the vehicle 11 on which the management ECU 101 is mounted, one or a plurality of substitute ECUs 111 to be caused to perform a target process that should be performed by one or a plurality of ECUs 111 among the plurality of ECUs 111; and performs a substitution control of causing the selected one or plurality of substitute ECUs 111 to perform the target process.

With this configuration, for example, the target process that should be performed by one or a plurality of high-wear-degree ECUs 111 can be distributed to another one or plurality of substitute ECUs 111. Thus, increase in the degree of wear of each high-wear-degree ECU 111 can be suppressed.

With the configuration in which the management server 121 estimates a degree of wear of each ECU 111, for example, a more accurate degree of wear can be calculated in the vehicle 11 by using both of the degree of wear estimated by the management server 121 and the degree of wear calculated in the vehicle 11.

Therefore, in the control system 302 according to the second embodiment of the present disclosure, the usable time period of each ECU 111 mounted on the vehicle 11 can be made longer.

In the control system 302 according to the second embodiment of the present disclosure, the dealer-side server 131 holds failure information regarding failures of a plurality of ECUs 111. The dealer-side server 131 transmits the failure information to the management server 121. The management server 121 estimates a degree of wear of one or a plurality of ECUs 111 on the basis of the acquired each piece of the wear information and the failure information received from the dealer-side server 131.

With the configuration in which the management server 121 estimates a degree of wear of each ECU 111 on the basis of the wear information and the failure information, a more accurate degree of wear can be calculated.

In a control method to be performed in the control system 302 according to the second embodiment of the present disclosure, first, with respect to a plurality of vehicles 11, the management server 121 acquires a plurality of pieces of wear information regarding the degree of wear of each of a plurality of ECUs 111 mounted on each vehicle 11. Next, on the basis of the acquired each piece of the wear information, the management server 121 estimates a degree of wear of one or a plurality of ECUs 111 in the vehicle 11 on which a management ECU 101 is mounted, and transmits estimation information indicating an estimation result, to the management ECU 101. Next, the management ECU 101: receives the estimation information transmitted from the management server 121; and on the basis of the received estimation information, selects, from the plurality of ECUs 111 in the vehicle 11 on which the management ECU 101 is mounted, one or a plurality of substitute ECUs 111 to be caused to perform a target process that should be performed by one or a plurality of ECUs 111 among the plurality of ECUs 111. Then, the management ECU 101 performs a substitution control of causing the selected one or plurality of substitute ECUs 111 to perform the target process.

With this method, for example, the target process that should be performed by one or a plurality of high-wear-degree ECUs 111 can be distributed to another one or plurality of substitute ECUs 111. Thus, increase in the degree of wear of each high-wear-degree ECU 111 can be suppressed.

With the method in which the management server 121 estimates a degree of wear of each ECU 111, for example, a more accurate degree of wear can be calculated in the vehicle 11 by using both of the degree of wear estimated by the management server 121 and the degree of wear calculated in the vehicle 11.

Therefore, in the control method performed in the control system 302 according to the second embodiment of the present disclosure, the usable time period of each ECU 111 mounted on the vehicle 11 can be made longer.

The features of the on-vehicle communication system 301 according to the first embodiment of the present disclosure and the features of the control system 302 of the second embodiment can also be combined as appropriate.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

REFERENCE SIGNS LIST 10, 11 vehicle
21 communication unit (acquisition unit)
22 selection unit
23 storage unit
24 control unit
101 management ECU (on-vehicle control device)
111 ECU (function unit)
111a extra-vehicular communication device
111b entertainment-related device
111c travel control device
111d camera
111e object detection sensor
111f temperature sensor
111g battery state monitoring sensor
111h automated driving ECU
121 management server (management device)
131 dealer-side server
161 wireless base station device
301 on-vehicle communication system
302 control system

The invention claimed is:

1. An on-vehicle control device comprising:
a management processor configured to perform as:
an acquisition unit that acquires a plurality of pieces of wear information regarding a degree of wear of each of a plurality of devices mounted on a vehicle, the plurality of devices including a travel control device configured to perform a control of travel of the vehicle;
a first selection unit that selects, from the plurality of devices, one or a plurality of the device as a first set of devices that should perform a target process;
a second selection unit that selects, from the plurality of function devices excluding the travel control device, one or a plurality of the devices as a second set of devices that should substitute the first set of devices to perform the target process, based on the plurality of pieces of wear information acquired by the acquisition unit; and
a control unit that performs a control of causing the one or plurality of the devices selected by the second selection unit to perform the target process, wherein
the wear information of a device of the plurality of devices includes information regarding history of temperature of the device, or information regarding the number of times of rewriting of a memory included in the device,
when the one or plurality of the devices are selected by the second selection unit, the control unit further performs a first control of reducing first processing load of the devices in the second set of devices, and
when no device is selected by the second selection unit, the control unit performs a second control of reducing second processing load of the devices in the first set of devices.

2. The on-vehicle control device according to claim 1, wherein
for the second set of devices, the second selection unit selects at least one device that is different from the devices in the first set of devices.

3. The on-vehicle control device according to claim 1, wherein
the control unit changes a communication frequency of the second set of devices, as the control of reducing the processing load.

4. The on-vehicle control device according to claim 1, wherein, for each of the plurality of devices,
the degree of wear is a proportion of an actual use time period in a predetermined period relative to a usable time period of the device, or a proportion of an actual number of times of rewriting in a predetermined period relative to a rewritable number of times of a memory included in the device,
the temperature is temperature influenced by both of ambient temperature of the device and generated heat of the device, and
the generated heat of the device includes heat generated due to operation of various resources in the device, heat generated due to turning on/off of a power supply of the device, and heat generated due to occurrence of a ripple current.

5. The on-vehicle control device according to claim 1, wherein the second selection unit selects the second set of devices only when the travel control device is a high-wear-degree function device whose degree of wear is not less than a reference, and does not select the second set of devices when the travel control device is not a high-wear-degree function device.

6. A control system comprising:
a management device; and
an on-vehicle control device, wherein
with respect to a plurality of vehicles, the management device
    acquires a plurality of pieces of wear information regarding a degree of wear of each of a plurality of devices mounted on each vehicle, the plurality of devices mounted on a vehicle including a travel control device configured to perform a control of travel of the vehicle, and
the on-vehicle control device
    on the basis of each piece of the wear information acquired by the management device, performs a first selection of selecting, from the plurality of devices in the vehicle on which the on-vehicle control device is mounted, one or a plurality of the devices as a first set of devices that should perform a target process,
    performs a second selection of selecting, from the plurality of devices excluding the travel control device, one or a plurality of the devices as a second set of devices that should substitute the first set of devices to perform the target process, based on the plurality of pieces of wear information acquired by the management device, and
    performs a control of causing the selected one or plurality of the devices selected by the second selection to perform the target process, wherein
the wear information of a device of the plurality of devices includes information regarding history of temperature of the device, or information regarding the number of times of rewriting of a memory included in the device,
when the one or plurality of the devices are selected by the second selection, the on-vehicle control device performs a first control of reducing first processing load of the devices in the second set of devices, and
when no device is selected by the second selection, the on-vehicle control device performs a second control of reducing second processing load of the devices in the first set of devices.

7. The control system according to claim 6, wherein
the control system further comprises a dealer-side server configured to hold failure information regarding failures of a plurality of the devices,
the dealer-side server transmits the failure information to the management device, and
on the basis of the acquired each piece of the wear information and the failure information received from the dealer-side server, the management device estimates the degree of wear of the one or plurality of the devices selected by the second selection.

8. The control system according to claim 6, wherein the second selection selects the second set of devices only when the travel control device is a high-wear-degree function device whose degree of wear is not less than a reference, and does not select the second set of devices when the travel control device is not a high-wear-degree function device.

9. A control method to be performed in an on-vehicle control device, the control method comprising the steps of:
    acquiring a plurality of pieces of wear information regarding a degree of wear of each of a plurality of devices mounted on a vehicle, the plurality of devices including a travel control device configured to perform a control of travel of the vehicle;
    on the basis of the acquired each piece of the wear information, first selecting, on the basis of the comparison, one or a plurality of the devices to be caused to perform the target process as a first set of devices that should perform a target process;
    second selecting, from the plurality of devices excluding the travel control device, one or a plurality of the devices as a second set of devices that should substitute the first set of devices to perform the target process, based on the acquired plurality of pieces of wear information; and
    performing a control of causing the selected one or plurality of the devices selected by the second selecting to perform the target process, wherein
the wear information of a device of the plurality of devices includes information regarding history of temperature of the device, or information regarding the number of times of rewriting of a memory included in the device,
the control method further comprises the steps of:
    when the one or plurality of the devices are selected in the second selecting, performing a first control of reducing first processing load of the devices in the second set of devices; and
    when no device is selected in the second selecting, performing a second control of reducing second processing load of the devices in the first set of devices.

10. The control method according to claim 9, wherein the second selecting selects the second set of devices only when the travel control device is a high-wear-degree function device whose degree of wear is not less than a reference, and does not select the second set of devices when the travel control device is not a high-wear-degree function device.

11. A control method to be performed in a control system including a management device and an on-vehicle control device, the control method comprising the steps of:
    with respect to a plurality of vehicles, acquiring, performed by the management device, a plurality of pieces of wear information regarding a degree of wear of each of a plurality of devices mounted on each vehicle, the plurality of devices mounted on a vehicle including a travel control device configured to perform a control of travel of the vehicle;
    on the basis of each piece of the wear information acquired by the management device, first selecting, performed by the on-vehicle control device, from the plurality of devices in the vehicle on which the on-vehicle control device is mounted, one or a plurality of the devices as a first set of devices that should perform a target process;
    second selecting, performed by the on-vehicle control device, from the plurality of devices excluding the travel control device, one or a plurality of the devices as a second set of devices that should substitute the first set of devices to perform the target process, based on the plurality of pieces of wear information acquired by the management device; and performing, by the on-vehicle control device, a control of causing the one or plurality of the devices selected in the second selecting to perform the target process, wherein the wear information of a device of the plurality of devices includes information regarding history of temperature of the device, or information regarding the number of times of rewriting of a memory includes in the device, the control method further comprises the steps of:

when the one or plurality of the devices are selected in the second selecting, performing, by the on-vehicle control device, a first control of reducing first processing load of the devices in the second set of devices; and when no device is selected in the second selecting, performing, by the on-vehicle control device, a second control of reducing second processing load of the devices in the first set of devices.

12. The control method according to claim 11, wherein the second selecting selects the second set of devices only when the travel control device is a high-wear-degree function device whose degree of wear is not less than a reference, and does not select the second set of devices when the travel control device is not a high-wear-degree function device.

13. A non-transitory computer readable storage medium storing a control program to be used in an on-vehicle control device, the control program causing a computer to function as:

an acquisition unit configured to acquire a plurality of pieces of wear information regarding a degree of wear of each of a plurality of devices mounted on a vehicle, the plurality of devices including a travel control device configured to perform a control of travel of the vehicle;

a first selection unit configured to select, from the plurality of devices, one or a plurality of the devices as a first set of devices that should perform a target process;

a second selection unit configured to select, from the plurality of devices excluding the travel control device, one or a plurality of the devices as a second set of devices that should substitute the first set of devices to perform the target process, based on the plurality of pieces of wear information acquired by the acquisition unit; and a control unit configured to perform a control of causing the one or plurality of the devices selected by the second selection unit to perform the target process, wherein the wear information of a device of the plurality of devices includes information regarding history of temperature of the device, or information regarding the number of times of rewriting of a memory includes in the device, when the one or plurality of the devices are selected by the second selection unit, the control unit further performs a first control of reducing first processing load of the devices in the second set of devices, and when no device is selected by the second selection unit, the control unit performs a second control of reducing second processing load of the devices in the first set of devices.

14. The on-vehicle control device according to claim 13, wherein the second selection unit selects the second set of devices only when the travel control device is a high-wear-degree function device whose degree of wear is not less than a reference, and does not select the second set of devices when the travel control device is not a high-wear-degree function device.

* * * * *